US007924517B2

(12) United States Patent
Ambar et al.

(10) Patent No.: US 7,924,517 B2
(45) Date of Patent: Apr. 12, 2011

(54) SPATIAL FILTER, A SYSTEM AND METHOD FOR COLLECTING LIGHT FROM AN OBJECT

(75) Inventors: Rafi Ambar, Ramat-Gan (IL); Refael Dela-Pergola, Jerusalem (IL)

(73) Assignee: Applied Materials Israel, Ltd., Rehovot (IL)

(*) Notice: Subject to any disclaimer, the term of this patent is extended or adjusted under 35 U.S.C. 154(b) by 555 days.

(21) Appl. No.: 11/681,098

(22) Filed: Mar. 1, 2007

(65) Prior Publication Data

US 2008/0043313 A1 Feb. 21, 2008

Related U.S. Application Data

(60) Provisional application No. 60/805,428, filed on Jun. 21, 2006.

(51) Int. Cl.
*G02B 5/22* (2006.01)
*G02B 7/00* (2006.01)
(52) U.S. Cl. .................. 359/891; 359/892; 359/896
(58) Field of Classification Search .................. 359/896
See application file for complete search history.

(56) References Cited

U.S. PATENT DOCUMENTS

| 3,009,065 | A  | * | 11/1961 | McKnight et al. ............ 250/233 |
| 3,614,232 | A  |   | 10/1971 | Mathisen |
| 6,392,793 | B1 |   | 5/2002  | Chuang et al. |
| 6,545,265 | B1 | * | 4/2003  | Czarnetzki et al. ........... 250/234 |
| 6,830,342 | B2 | * | 12/2004 | Lee ................................. 353/84 |
| 2003/0058433 | A1 | | 3/2003 | Almogy et al. |

* cited by examiner

*Primary Examiner* — Stephone B Allen
*Assistant Examiner* — Jade R Chwasz
(74) *Attorney, Agent, or Firm* — SNR Denton US LLP

(57) ABSTRACT

A spatial filter that includes multiple opaque regions and multiple transparent regions; wherein at least a pair of opaque regions out of the multiple opaque regions are much longer than a cross sectional dimension of a light beam that impinges onto the spatial filter; and wherein an axial distance between the pair of opaque regions alters as a function of a rotational angle of the spatial filter. A spatial filter that includes multiple opaque regions and multiple transparent regions; wherein multiple groups of transparent regions are substantially shaped as portions of different spirals; wherein the different spirals are characterized by different separation distances between successive spiral turnings.

5 Claims, 8 Drawing Sheets

SPATIAL FILTER, A SYSTEM AND METHOD FOR COLLECTING LIGHT FROM AN OBJECT

RELATED APPLICATIONS

This application is a nonprovisional of, claims priority to and incorporates by reference U.S. provisional patent application No. 60/805,428, entitled "CONTINUOUS ROTARY PUPIL PLANE MASK", filed Jun. 21, 2006.

FIELD OF THE INVENTION

The present invention relates to a spatial filter as well as to a system for collecting light from an object and a method for collecting light from an object such as a wafer, a reticle, a mask and the like.

BACKGROUND

Light collecting systems such as wafer inspection systems can use area illumination to illuminate areas of a sample. Light reflected and/or scattered from an illuminated area is collected by collection optics and detected by detectors. Light collecting systems can alternatively use a scanning light beam that scans the sample.

The intensity (and possibly other characteristics) of the collected light is compared to an expected range of values. Deviations of the scattered light from the expected range can be indicative of defects in or on the substrate.

The sensitivity of a light collecting system depends on its signal/noise ratio (SNR). In this context, the signal corresponds to the amount of light scattered from the defect that is able to reach the detector. The "noise" is generally dominated by background light that is reflected or otherwise scattered from the substrate itself. (In the context of the present patent application and in the claims, the term "scattered" refers to all radiation returned from the surface, due to substantially any physical mechanism, including diffractive scattering and both specular and diffuse reflection.)

When a patterned semiconductor substrate is illuminated with coherent light, for example, the light is diffracted from the repetitive pattern and generates constructive interference lobes along well-defined directions. The positions and extent of the interference lobes depend on the period of the pattern, as well as the wavelength of the incident radiation and characteristics of the optical system. Accordingly, in order to block different interference patterns a very large number of spatial filter configurations are required.

It is known in the art that blocking the interference lobes can facilitate the detection of defects and pattern irregularities on the substrate. For example, U.S. Pat. No. 3,614,232, to Mathisen, whose disclosure is incorporated herein by reference, describes a spatial filter for detecting defects in photomasks, using a transmission geometry and a simple filter consisting substantially of the negative of the Fourier transform of a defect-free specimen of the microcircuit.

Filtering ultra violet light as well as deep ultra violet light and even extreme deep ultra violet light is very problematic as many spatial filters (including for example liquid crystal spatial filters) are opaque to this radiation.

There is a need to provide efficient spatial filters and efficient systems.

SUMMARY OF THE INVENTION

A spatial filter that includes multiple opaque regions and multiple transparent regions; wherein at least a pair of opaque regions out of the multiple opaque regions are much longer than a cross sectional dimension of a light beam that impinges onto the spatial filter; and wherein an axial distance between the pair of opaque regions alters as a function of a rotational angle of the spatial filter.

Conveniently, the axial distance between the pair of opaque regions constantly changes over an axial distance range.

Conveniently, the width of each opaque region out of the pair of opaque regions alters as a function of a rotational angle of the spatial filter.

Conveniently, at least one opaque region is substantially shaped as a portion of a spiral.

Conveniently, at least one opaque region is shaped as a linear approximation of a portion of a spiral.

Conveniently, multiple opaque regions are shaped substantially as portions of different spirals; wherein different spirals have different separation distances between successive spiral turnings.

Conveniently, the opaque regions and the transparent regions are shaped according to expected lobe patterns.

A spatial filter that includes multiple opaque regions and multiple transparent regions; wherein multiple groups of transparent regions are substantially shaped as portions of different spirals; wherein the different spirals are characterized by different separation distances between successive spiral turnings.

Conveniently, the different spirals include at least one clockwise rotating spiral and at least one counterclockwise rotating spiral.

Conveniently, at least one opaque region is shaped as a linear approximation of a portion of a spiral.

Conveniently, the axial distance between adjacent transparent regions within a first group of transparent region differs from an axial distance between adjacent transparent regions within a second group of transparent region.

Conveniently, at least one opaque region is substantially shaped as a portion of an Archimedean spiral.

A light collecting system that includes: an illumination module adapted to illuminate an area of an inspected object; and a collection module adapted to collect light returned from the illuminated area; wherein the collection module includes a spatial filter that includes multiple opaque regions and multiple transparent regions; wherein at least a pair of opaque regions out of the multiple opaque regions are much longer than a cross sectional dimension of a light beam that impinges onto the spatial filter; and wherein an axial distance between the pair of opaque regions alters as a function of a rotational angle of the spatial filter.

Conveniently, the spatial filter is placed at a certain angle in relation to a collection module axis.

Conveniently, the system is adapted to rotate the spatial filter, during an object inspection sequence, in response to an expected lobe pattern.

Conveniently, the system is adapted to rotate the spatial filter, during a configuration stage, such as to determine a position of the spatial filter.

Conveniently, the axial distance between the pair of opaque regions constantly changes over an axial distance range.

Conveniently, the width of each opaque region out of the pair of opaque regions alters as a function of a rotational angle of the spatial filter.

Conveniently the width of each opaque region out of the pair of opaque regions alters as a function of a rotational angle of the spatial filter.

Conveniently, at least one opaque region is substantially shaped as a portion of a spiral.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Figure 1:
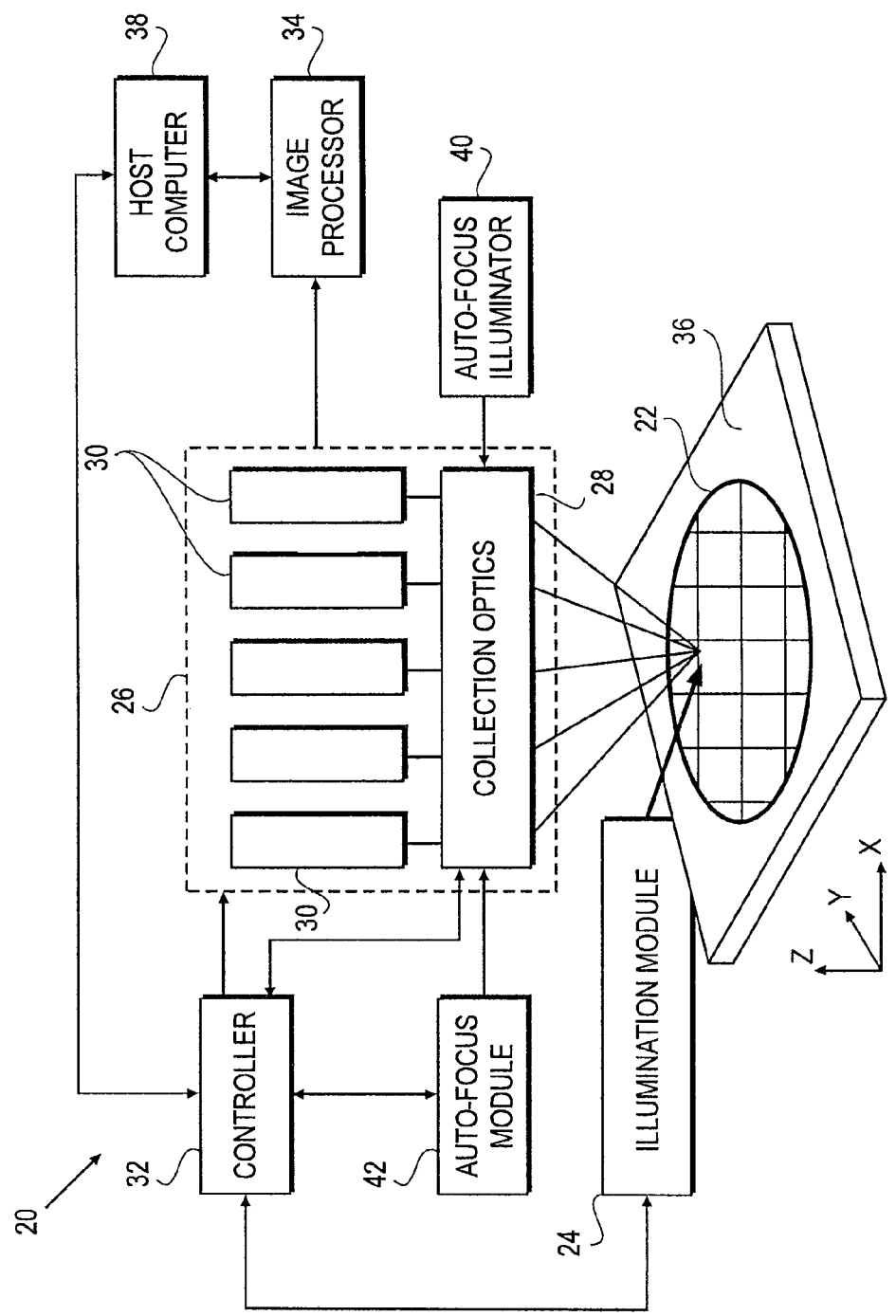
FIG. 1 illustrates a schematic representation of a light collecting system according to an embodiment of the invention.

The following detailed description is of exemplary embodiments of the invention but the invention is not limited thereto, as modifications and supplemental structures may be added, as would be apparent to those skilled in the art. In particular, but without limitation, while an exemplary embodiment may be disclosed with regard to the inspection, review or metrology of an object surface by detecting reflected light using a light source and detecting unit that are disposed on a common side of an object (a "reflective system"), it would be readily apparent to one skilled in the art that the teachings are readily adaptable to the inspection of an object by detecting transmitted light with a detecting unit that is on a side of an object opposite to that of the light source (a "transmissive system"). While the reflective system and the transmissive system differ, for one example by the absence of a beam splitter in the transmissive system, the principles of the present invention are applicable to both types of systems. As would be understood by one skilled in the art, both types of systems may be utilized separately or together in the inspection of an object, in accordance with the present invention.

It is noted that the object can be illuminated by light and light can be collected by a light collecting system. The light collecting system can detect the light and then detect defects, measure features of the object and the like. For simplicity of explanation the following example will refer to an object inspection system.

A spatial filter is provided. The spatial filter enables one to change the distance between opaque regions of a spatial filter by rotating the spatial filter. The spatial filter provides a very large number of axial distances between pairs of opaque regions, thus enabling one to block lines of interference lobes that are located in various distances from each other.

The spatial filter includes multiple transparent and oblique regions. A transparent region can include an aperture defined by adjacent opaque regions.

Conveniently, opaque regions have different diverging or converging ratios thus the distance between pairs of opaque regions alters as a function of a rotational angle of the spatial filter. Assuming that there is an imaginary coordinate system having its origin at the center of the spatial filter then the rotational angle is defined as an angle between an imaginary x-axis and an imaginary radial line that stretched=s from the origin of the imaginary coordinate system.

Conveniently, the transparent regions (as well as adjacent opaque regions) are positioned near the circumference of the spatial filter.

By rotating the spatial filter differential axial movement of the opaque regions is achieved. The spatial filter can define a continuous variation in the axial position of the opaque regions (also referred to as blockades).

The spatial filter can be rotated about its axis. The axis of the spatial disc can be parallel to a collection path axis but it can also be oriented to said collection path axis.

Usually, the spatial filter is positioned at a Fourier plane of an objective lens of the collection module but this is not necessarily so.

The spatial filter can be rotated such as to mask the lobes generated at different illumination light beam frequencies. The spatial filter can be rotated such as to block lobes that have different spatial offsets in relation to the spatial filter.

According to an embodiment of the invention multiple (for example a pair of) spatial filters are positioned at a propagation path of a collected light beam. The spatial filters can be parallel to each other, oriented in relation to each other, shifted in relation to each other and the like.

FIG. 1 is a block diagram that schematically illustrates a system 20 for optical inspection of an object such as but not limited to semiconductor wafer 22, in accordance with an embodiment of the present invention. Typically, wafer 22 is patterned, using methods of semiconductor device production known in the art, and system 20 applies dark-field optical techniques to detect defects on the surface of the wafer. Alternatively, however, the principles embodied in system 20 may be applied to unpatterned wafers and to inspection of other types of samples and surfaces, as well, such as masks and reticles. Furthermore, although system 20 is dedicated to dark-field inspection, aspects of the present invention may also be applied in bright-field inspection, as well as in other areas of illumination, inspection and imaging.

Figure 5:
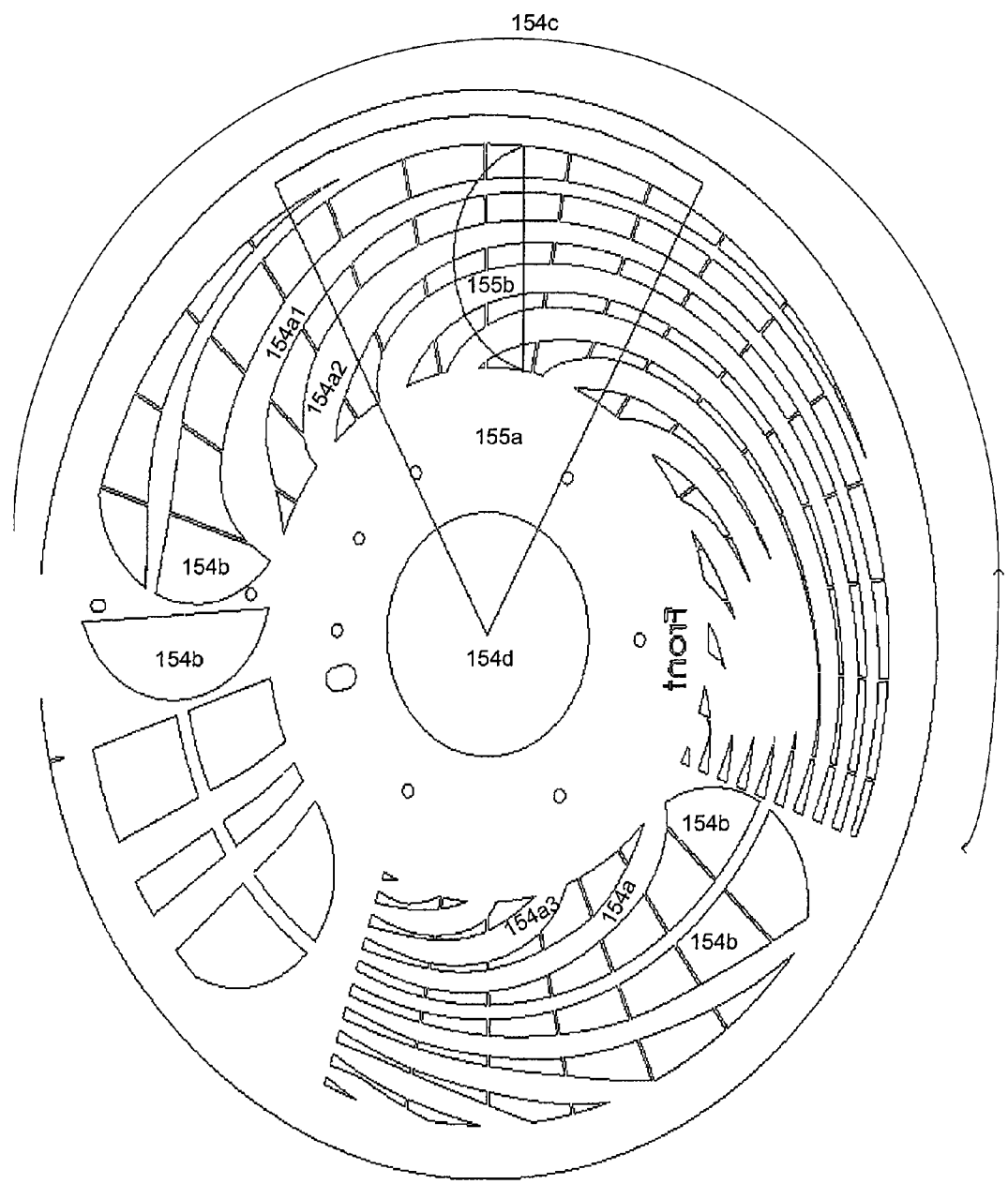
FIG. 5 illustrates a spatial filter, according to an embodiment of the invention.

According to an embodiment of the invention system 20 includes illumination module 24 adapted to illuminate an area of an inspected object and collection module 26 that is adapted to collect light returned from the illuminated area. Collection module 26 includes one or more spatial filters 154 wherein the spatial filter includes multiple opaque regions and multiple transparent regions. At least a pair of opaque regions out of the multiple opaque regions are much longer than a cross sectional dimension of a light beam that impinges onto the spatial filter. The axial distance between the pair of opaque regions alters as a function of a rotational angle of the spatial filter. FIG. 5 illustrates an exemplary spatial filter 154.

According to an embodiment of the invention system 20 includes illumination module 24 adapted to illuminate an area of an inspected object and collection module 26 that is adapted to collect light returned from the illuminated area. Collection module 26 includes one or more spatial filters 154' wherein the spatial filter includes multiple opaque regions and multiple transparent regions. Multiple groups of transparent regions (and accordingly opaque regions) are substantially shaped as portions of different spirals. The different spirals are characterized by different separation distances between successive spiral turnings. These opaque regions can be a linear approximation of these portions of the spirals. These spirals can be Archimedean spirals but this is not necessarily so.

Figure 2:
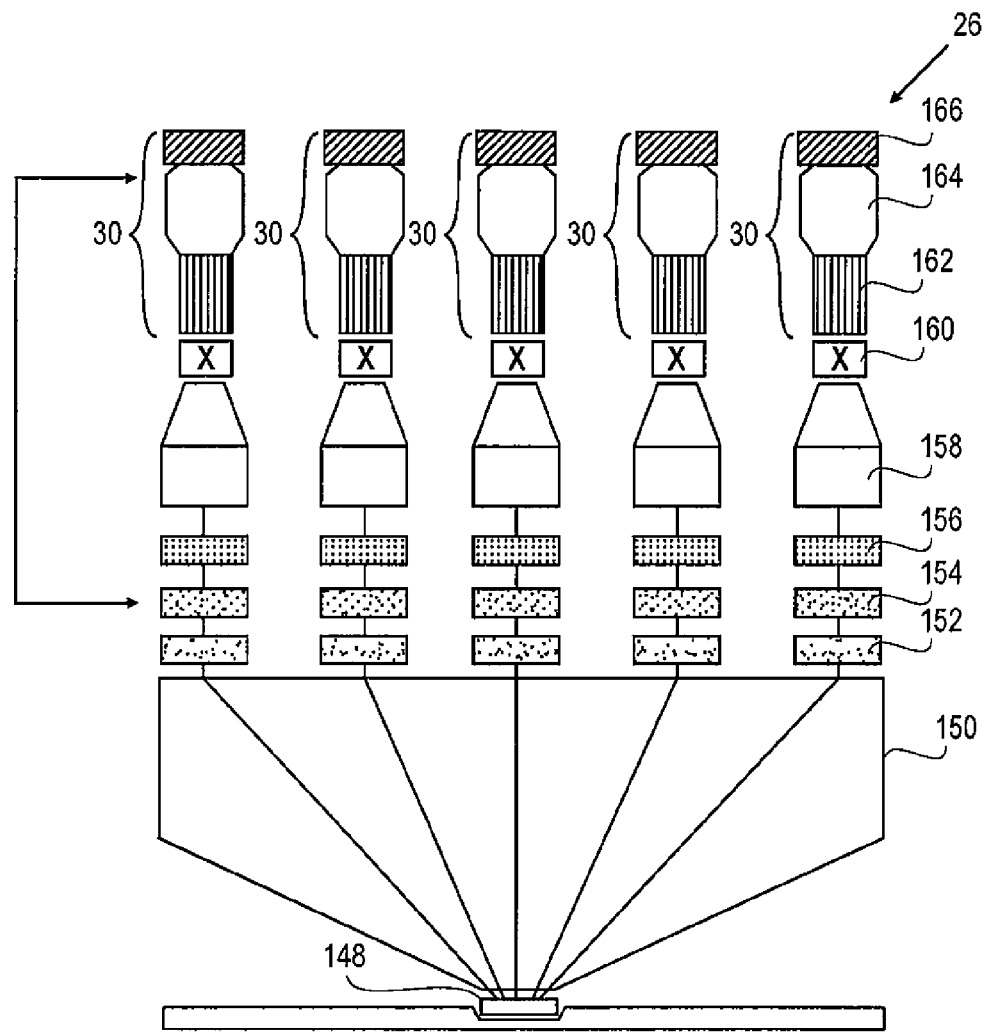
FIG. 2 illustrates an optical collection module of the light collecting system according to an embodiment of the invention.

Conveniently, the spatial filter is placed at a certain angle in relation to a collection module axis. The certain angle can be determined by the operator, can be fixed, can be substantially ninety degrees but can also differ and even substantially differ from ninety degrees. FIG. 2 illustrates horizontal spatial filters 154 and a vertical collection module axis, but other configuration can be provided.

Conveniently, different lobe patterns are expected to be generated over different locations of the inspected object. System 20 can rotate the spatial filter, during an object inspection sequence, in response to an expected lobe pattern. System 20 can also alter the certain angle between the spatial filter and the collection module axis during said inspection.

System 20 comprises an illumination module 24, which illuminates the surface of sample 22 using pulsed laser radiation. Typically, module 24 is able to emit the laser radiation selectably at two or more different wavelengths, either simultaneously or one at a time. The laser radiation at any of the laser wavelengths may be directed by module 24 to impinge on wafer 22 either along a normal to the wafer surface or obliquely, as described hereinbelow. The illumination module may be configured to emit optical radiation at wavelengths in the visible, ultraviolet (UV) and/or infrared (IR) ranges. The terms "illumination" and "optical radiation" as used herein should therefore be understood as referring to any or all of the visible, UV and IR ranges.

The radiation scattered from wafer 22 is collected over a large range of angles by an optical collection module 26. Module 26 comprises collection optics 28, which image the surface of wafer 22 onto multiple cameras 30. Optics 28 may comprise either a single objective with high numerical aperture (NA) or a collection of individual objectives, one for each camera. Details of both of these alternative optical configurations, as well as of cameras 30, are described hereinbelow. Optics 28 and cameras 30 are arranged so that all the cameras image the same area on the wafer surface, i.e., the area illuminated by illumination module 24, while each camera captures the radiation that is scattered into a different angular range. Each camera 30 comprises a two-dimensional array of detector elements, such as a CCD or CMOS array, as is known in the art. Each detector element of each of the arrays is imaged onto a corresponding spot within the area irradiated by illumination module 24. Thus, the scattering characteristics of any given spot on wafer 22 as a function of angle can be determined based on the signals generated by the corresponding detector elements in the different cameras 30.

Cameras 30 are typically synchronized with the laser pulses from illumination module by a system controller 32, so that each image output frame generated by each camera corresponds to the radiation scattered from a single laser pulse. The output from each camera is received, digitized and analyzed by an image processor 34. The image processor, as described in detail hereinbelow, typically comprises dedicated hardware signal processing circuits and/or programmable digital signal processors (DSPs). A mechanical scanner, such as an X-Y-Z stage 36 translates wafer 22, typically in a raster pattern, so that each laser pulse from illumination module 24 irradiates a different area of the surface of the wafer, adjacent to (and typically slightly overlapping with) the area irradiated by the preceding pulse. Alternatively or additionally, the illumination and collection modules may be scanned relative to the wafer.

Image processor 34, processes each of the image frames that is output by each of cameras 30 in order to extract image features that may be indicative of defects on the wafer surface. The image features are passed to a host computer 38, typically a general-purpose computer workstation with suitable software, which analyzes the features in order to generate a defect list (or defect map) with respect to the wafer under inspection.

The area irradiated by module 24 and imaged by cameras 30 can be scanned using stage 36 over the entire wafer surface, or over a selected area of the surface. If the pulses emitted by module 24 are sufficiently short, substantially less than 1. mu.s, for example, stage 36 may translate wafer 22 continuously in this manner without causing significant blur in the images captured by the cameras. The irradiated area typically has dimensions on the order of 2.times.1 mm, although the area can be enlarged or reduced using magnification optics in the illumination module, as described hereinbelow. Assuming each camera 30 to comprise an array of about 2000.times.1000 detector elements, the size of each pixel projected onto the wafer surface is then roughly 1.times.1 micron. With module 24 operating at a repetition rate of 400 pulses/sec, the data output rate of each camera 30 to image processor 34 will be 800 Mpixels/sec. At this rate, for instance, an entire 12" semiconductor wafer can be scanned at 1 .micron resolution in less than 2 min. It will be understood, however, that these typical figures of image resolution, size and speed are cited solely by way of example, and larger or smaller figures may be used depending on system speed and resolution requirements.

Controller 32 also adjusts the Z-position (height) of stage 36 in order to maintain the proper focus of cameras 30 on the wafer surface. Alternatively or additionally, the controller may adjust the camera optics for this purpose. Further alternatively or additionally, the controller may instruct image processor 34 and host computer 38 to correct for deviations in the scale and registration of the images captured by different cameras 30 so as to compensate for height variations.

In order to verify and adjust the focus, controller 32 uses an auto-focus illuminator 40 and an auto-focus sensor module 42. Illuminator 40 typically comprises a laser (not shown), such as a CW diode laser, which emits a collimated beam at an oblique angle onto or adjacent to the area of the surface of wafer 22 that is illuminated by illumination module 24, forming a spot on the wafer surface.

Variations in the Z-position of wafer 22 relative to collection module 26 will then result in transverse displacement of the spot. Sensor module 42 typically comprises a detector array (also not shown), which captures an image of the spot on the wafer surface. The image of the spot is analyzed in order to detect the transverse position of the spot, which provides controller 32 with a measurement of the Z-position of the wafer surface relative to the collection module. The controller may drive stage 36 until the spot is in a pre-calibrated reference position, indicative of proper focus.

The beam emitted by illuminator 40 may pass through collection optics 28 on its way to the wafer surface, and sensor module 42 may likewise capture the image of the spot on the surface through the collection optics. In this case, illuminator 40 preferably operates in a different wavelength range from illumination module 24. Thus, appropriate filters may be used to block scatter of the auto-focus beam into cameras 30, as well as preventing interference of the pulsed beam from module 24 with the auto-focus measurement.

Alternatively, other means of auto-focus detection may be used, as are known in the art. For example, a capacitive sensor may be used to determine and adjust the vertical distance between the optics and the wafer surface.

FIG. 2 illustrates an optical collection module 26 of the wafer inspection system according to an embodiment of the invention. In this embodiment and in the embodiment shown in FIG. 1, module 26 is shown as comprising five cameras 30. Alternatively, module 26 may comprise a smaller or greater number of cameras, typically as many as ten cameras. As noted above, all the cameras image scattered radiation from a common area 148 on the surface of wafer 22, but each camera is configured to collect the radiation along a different angular axis (i.e., a different elevation and/or azimuth). Although system 20 is designed mainly for use in dark-field detection, one or more of cameras 30 may be used for bright-field detection, as well, in conjunction with either the normal-incidence or oblique-incidence illumination beam.

An objective 150 collects and collimates the scattered light from area 148. In order to collect scattered light at low elevation, objective 150 preferably has a high NA, most preferably as high as 0.95. An exemplary design of objective 150, using multiple refractive elements, is described hereinbelow with reference to FIG. 3. Alternatively, objective 150 may comprise a reflective or catadioptric element, as described, for example, in U.S. Pat. No. 6,392,793. Each of cameras 30 is positioned, as shown in FIG. 2, to receive a particular angular portion of the light collected by objective 150.

For each camera 30, a bandpass filter 152 selects the wavelength range that the camera is to receive. Typically, filter 152 selects one of the two wavelengths emitted by illumination module 24, while rejecting the other wavelength. Filter 152 may also be implemented as a dichroic beamsplitter, and configured so that one of cameras 30 receives the scattered light along a given angle at one wavelength, while another camera receives the scattered light along the same angle at the other wavelength. As a further alternative, filter 152 may be chosen to pass radiation in another wavelength range, such as a band in which wafer 22 is expected to fluoresce. For example, when organic materials, such as photoresist, are irradiated at 266 nm, they tend to fluoresce in the range of 400 nm. Thus, setting filter 152 to pass light in the 400 nm band allows camera 30 to detect defects in the organic material or residues thereof.

A spatial filter 154 can be used to limit the collection angle of each camera 30, by blocking certain regions of the collimated scattered light. The spatial filter is especially useful in eliminating background diffraction from repetitive features on patterned wafers. Two exemplary spatial filters will be later described in relation to FIG. 5 and FIG. 6.

A rotatable polarizer 156 is provided in the optical path in order to select the direction of polarization of scattered light that is to be received by camera 30. The polarizer is useful, for example, in improving detection sensitivity by rejecting background scatter due to rough and/or highly-reflective surface structures on wafer 22. Optionally, polarizer 156 is implemented as a polarizing beamsplitter, which is configured so that two cameras 30 receive the light scattered along a given angle in orthogonal polarizations.

As a further option (not shown in the figures), the optical path may comprise a beamsplitter, which divides the light scattered along a given collection angle between two or more different cameras 30. The beamsplitter may be used for wavelength division, as mentioned above, or to divide the same wavelength between the two or more cameras in a predetermined proportionality. Different spatial filters 154 may be used following the beamsplitter in the beam paths to the different cameras, in order to filter out diffraction lobes due to different sorts of patterns on the wafer. As a further alternative, the beamsplitter may divide the light scattered along a given angle unequally between two or more of the cameras, for example, in a ratio of 100:1. This arrangement effectively increases the dynamic range of system 20, since the camera receiving the smaller share of the radiation is still able to generate meaningful image data even in areas of bright scatter, in which the camera receiving the larger share of the radiation is saturated. An arrangement of this sort is described, for example, in U.S. patent application Ser. No. 10/050,889, filed Jan. 15, 2002, which is assigned to the assignee of the present patent application and whose disclosure is incorporated herein by reference.

A focusing lens 158 focuses the collected and filtered light onto camera 30. Lens 158 may be adjustable, either manually or under motorized control. A variable magnifier 160 may be used to change the size of the magnified image received by the camera. Alternatively, the functions of lens 158 and magnifier 160 may be combined within a single optical unit for each camera. The magnifier determines the resolution of the image captured by camera 30, i.e., the size of the area on the wafer surface that corresponds to each pixel in the output image from the camera. Magnifier 160 is typically operated in conjunction with telescopes in illumination module 24, so that size of the illuminated area is roughly equal to the area imaged by the cameras.

Each camera 30 comprises an image intensifier 162, whose photocathode is aligned at the image plane of the focusing lens and magnifier. Any suitable type of image intensifier tube may be used for this purpose, including both first- and second-generation types, such as the C6654 image intensifier produced by Hamamatsu Photonics K.K. (Shizuoka-ken, Japan). To provide optimal imaging in the demanding environment of system 20, intensifier 162 preferably has high bandwidth and high resolution, and is preferably capable of gated operation, with high current and low phosphor memory, at the repetition rate of laser head typically up to about 1000 pulses per sec. The useful diameter of intensifier 162 is preferably at least 18 mm, but a larger diameter, in the range of 25-40 mm, may be even more advantageous.

The output of image intensifier 162 is focused by relay optics 164 onto an image sensor 166. The relay optics may comprise, for example, either a relay lens or a fiberoptic faceplate coupled directly to the image sensor chip. Image sensor 166 comprises a two-dimensional matrix of detector elements, such as a CCD or CMOS array, as is known in the art. For example, the image sensor may comprise a CMOS digital image sensor, such as model M1-MV13, made by Micron Technology Inc. (Boise, Id.). This sensor has 1280.times.1024 pixels, with 12. micronvertical and horizontal pitch, and a frame rate up to 500 frames per second for full frames.

The use of image intensifiers 162 in cameras 30 increases the sensitivity of the cameras substantially over cameras using image sensors 166 alone without intensification. The intensifiers may be gated, in synchronization with the light pulses from illumination module 24, in order to increase the sensitivity of the cameras and reduce their noise levels still further. Typically, the photocathodes of intensifiers 162 are chosen to have high quantum efficiency at the wavelengths emitted by the illumination module, while the phosphors of the intensifiers may be chosen to emit light in a different wavelength range in which image sensors 166 have high responsivity. Thus, the image intensifiers, in addition to amplifying the incident scattered light, are also useful in downconverting the ultraviolet (UV) and blue light that is scattered from wafer 22 to the green or red range, to which the silicon image sensors are more responsive. In addition, intensifiers 162 act as low-pass spatial filters, and may thus help to smooth high-frequency structures in the scattered light that might otherwise cause aliasing in the images output by sensors 166.

Intensifiers 162 preferably have high resolution, as dictated by the resolution of sensors 166. For example, to take full advantage of the resolution of the above-mentioned MV13 sensor, intensifier 162 should be designed to provide 1640 distinct pixels along the image diagonal. This resolution criterion may also be expressed in terms of the modulation transfer function (MTF) of the intensifier, giving MTF=30% for a test image with 33 line pairs/mm. Bright points in the image captured by cameras 30 can result in formation of a bright halo, generally due to reflections inside the image intensifier tube, which may compromise the resolution of the image. Intensifiers 162 are preferably designed to suppress such reflections so that the halo diameter is no more than 0.2 mm in any case. Furthermore, in order to exploit the full range of sensitivity of sensor 166, intensifier 162 should exhibit linear behavior up to high maximum output brightness (MOB), typically on the order of 600 .mu.W/cm.sup.2.

Figure 3:
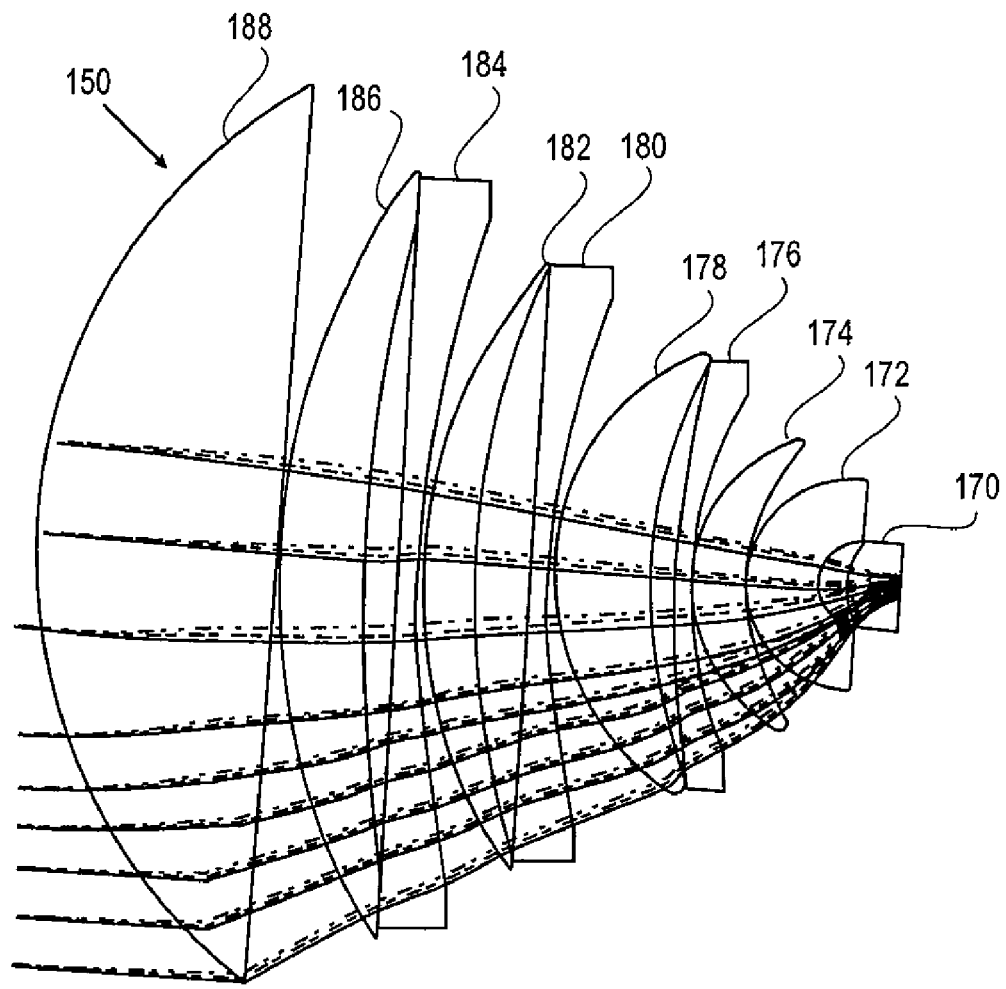
FIG. 3 is a schematic optical diagram showing details of an objective, in accordance with an embodiment of the present invention.

FIG. 3 is a schematic optical diagram showing details of objective 150, in accordance with an embodiment of the present invention. In this embodiment, objective 150 comprises ten elements, all made from fused silica (refractive index 1.499679), having dimensions (in mm) as listed below. The first surface of each element is the surface closer to the object plane (at the right side of the figure), and radii of curvature are listed as positive for surfaces whose center of curvature is located to the right of the surface.

Lens 170—First surface curvature: −554.32; distance from object plane: 0.10; Thickness: 28.92; Second surface curvature: 38.23.

Lens 172—First surface curvature: 22.17; distance from second surface of lens 172: 14.35; Thickness: 42.86; Second surface curvature: 59.97.

Lens 174—First surface curvature: 116.11; distance from second surface of lens 172: 0.10; Thickness: 28.99; Second surface curvature: 90.24.

Lens 176—First surface curvature: 233.96; distance from second surface of lens 174: 0.10; Thickness: 10.00; Second surface curvature: 578.50.

Lens 178—First surface curvature: 260.16; distance from second surface of lens 176: 15.94; Thickness: 53.07; Second surface curvature: 136.10.

Lens 180—First surface curvature: 446.16; distance from second surface of lens 178: 0.10; Thickness: 10.00; Second surface curvature: −2850.63.

Lens 182—First surface curvature: 473.81; distance from second surface of lens 180: 34.11; Thickness: 28.54; Second surface curvature: 294.90.

Lens 184—First surface curvature: 701.43; distance from second surface of lens 182: 0.10; Thickness: 10.00; Second surface curvature: −4117.15.

Lens 186—First surface curvature: 1275.43; distance from second surface of lens 184: 21.78; Thickness: 48.42; Second surface curvature: 395.84.

Lens 188—First surface curvature: −11047.73; distance from second surface of lens 186: 0.10; Thickness: 132.30; Second surface curvature: 313.99.

Objective 150, as shown in FIG. 3, has NA=0.95.

Figure 4:
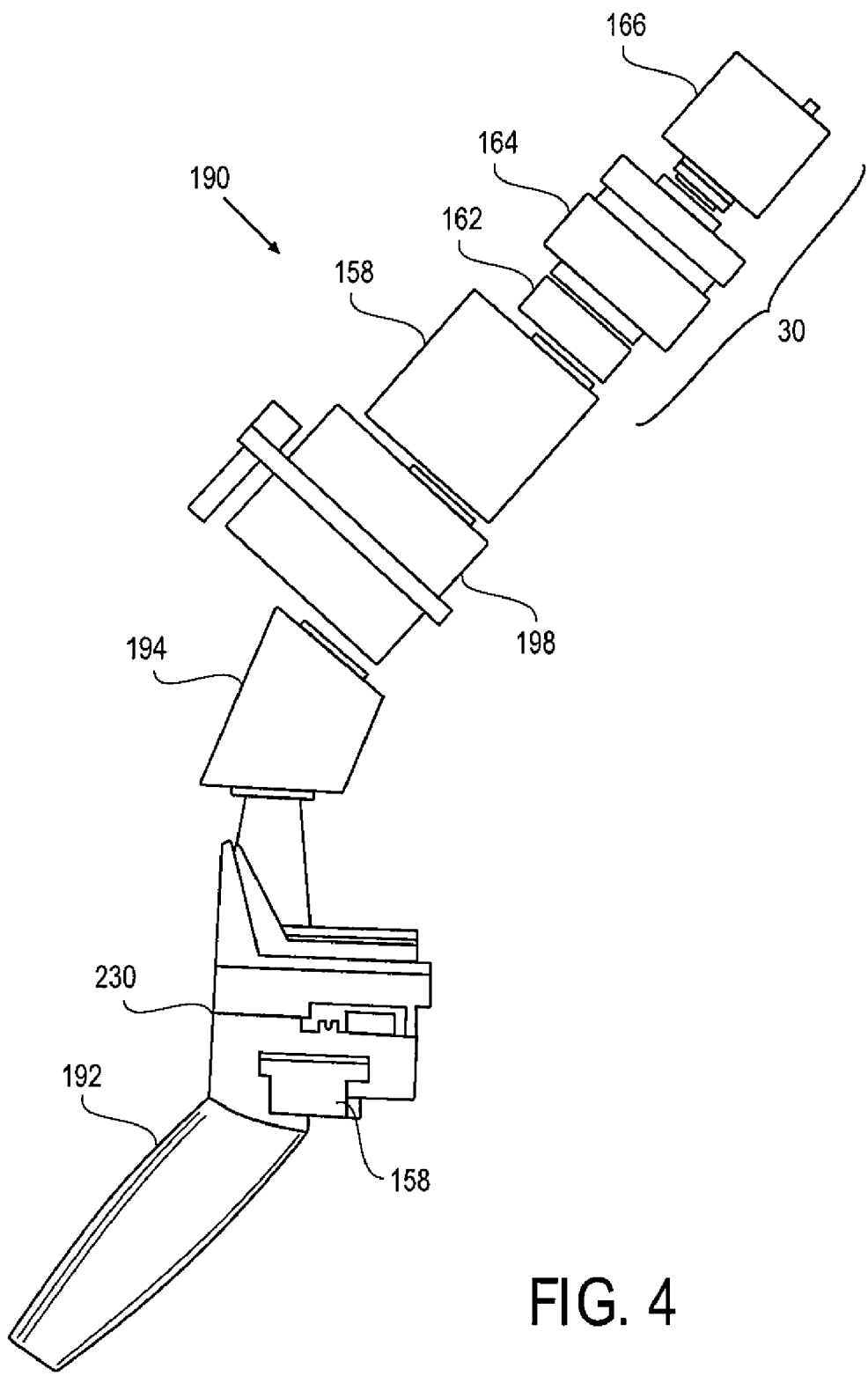
FIG. 4 is a portion of an optical collection channel of the optical collection module according to an embodiment of the invention.

FIG. 4 is a schematic side view of one of imaging channels 190, showing aspects of the mechanical design of the optics and camera 30, in accordance with an embodiment of the present invention. In this embodiment, for reasons of mechanical convenience, a focal relay 192 includes a turning mirror (not shown), which bends the optical axis of the relay into the bent form illustrated in the figure. Functionally, however, relay 192 operates in substantially the manner described above. A filter unit 230, positioned at the center of relay 192, accommodates polarizer 156, as well as wavelength filter 152 (not shown in this figure) and spatial filter 154 as required.

The positions of focusing lens 158 and magnification module 198 are reversed in this embodiment, relative to the positions of the focusing lens and magnifier 160 in FIG. 2, but their functions are substantially the same. Module 198 comprises multiple different lenses, with different magnifications, which may be selected by rotating the module, as in a telescope assembly. Assuming the resolution of intensifier 162 to be about 15 micron while camera 30 is intended to form images of the wafer surface with resolution (measured in the object plane) between 0.5 micron and 4 micron, it is desirable that module 198 provide magnifications between approximately 4.times. and 32.times. Magnification nodule 198 may comprise a selection of custom objectives and/or off-shelf microscope objectives, which are chosen to meet these magnification requirements, for example.

FIG. 5 illustrates spatial filter 154, according to an embodiment of the invention.

Spatial filter 154 includes multiple opaque regions 154*a* and multiple transparent regions 154*b*. Transparent regions 154*b* can be apertures or made of transparent materials.

FIG. 5 also illustrates a cross section of a beam 155*b* that impinges onto spatial filter 154. The cross section of the light beam is illustrated as a white half-circular shape 155*b* that is surrounded by a darker triangular shape 155*a*.

Conveniently, at least a pair of opaque regions out of the multiple opaque regions are much longer (as illustrated by length 154*c*) than a cross sectional dimension (such as width 155*c*) of light beam 155*a*. The axial distance between the pair of opaque regions alters as a function of a rotational angle of the spatial filter.

Referring to opaque region 154*a*1 and 154*a*2—the distance between them changes at different rotational angles of spatial filter.

Conveniently, the axial distance between the pair of opaque regions constantly changes over an axial distance range.

Conveniently, the width of each opaque region out of the pair of opaque regions alters as a function of a rotational angle of the spatial filter.

Conveniently, at least one opaque region is substantially shaped as a portion of a spiral.

Conveniently, at least one opaque region is shaped as a linear approximation of a portion of a spiral. The linear approximation is used because in many cases the lobes appear in linear groups. Thus, in order to block the lines of lobes a substantially linear opaque layer should be used.

Conveniently, multiple opaque regions are shaped substantially as portions of different spirals. Different spirals have different separation distances between successive spiral turnings. Referring to FIG. 5, opaque region 154*a*1 is shaped substantially as a portion of a first spiral that differs by the spacing between its turning than the spiral that is approximated by opaque region 154*a*3.

Conveniently, the opaque regions and the transparent regions are shaped according to expected lobe patterns. When a spatial filter is designed the expected lobe patterns can be fed to a computer that select the spiral characteristics (for example—select variables a and b where an Archimedean spiral can be described in polar coordinates as r=a+bΘ). In addition the linear approximation can also be selected to provide adequate cover of linear arrays of lobes.

Spatial filter 154 can be rotated about its axis. It can be connected in various manners to a rotating axis. FIG. 5 illustrates a central aperture 154*d* through which a rotating axis can be connected, although other connections can be used.

Conveniently, at least one opaque region is substantially shaped as a portion of an Archimedean spiral. An Archimedean spiral is characterized by a constant separation between successive turnings of the spiral. This enables one to maintain the distance between a pair of opaque regions while providing an axial displacement, by rotating spatial filter 154. It is noted that at least one opaque region can be approximately shaped as a portion of other types of spirals such as a logarithmic spiral and the like.

Figure 6:
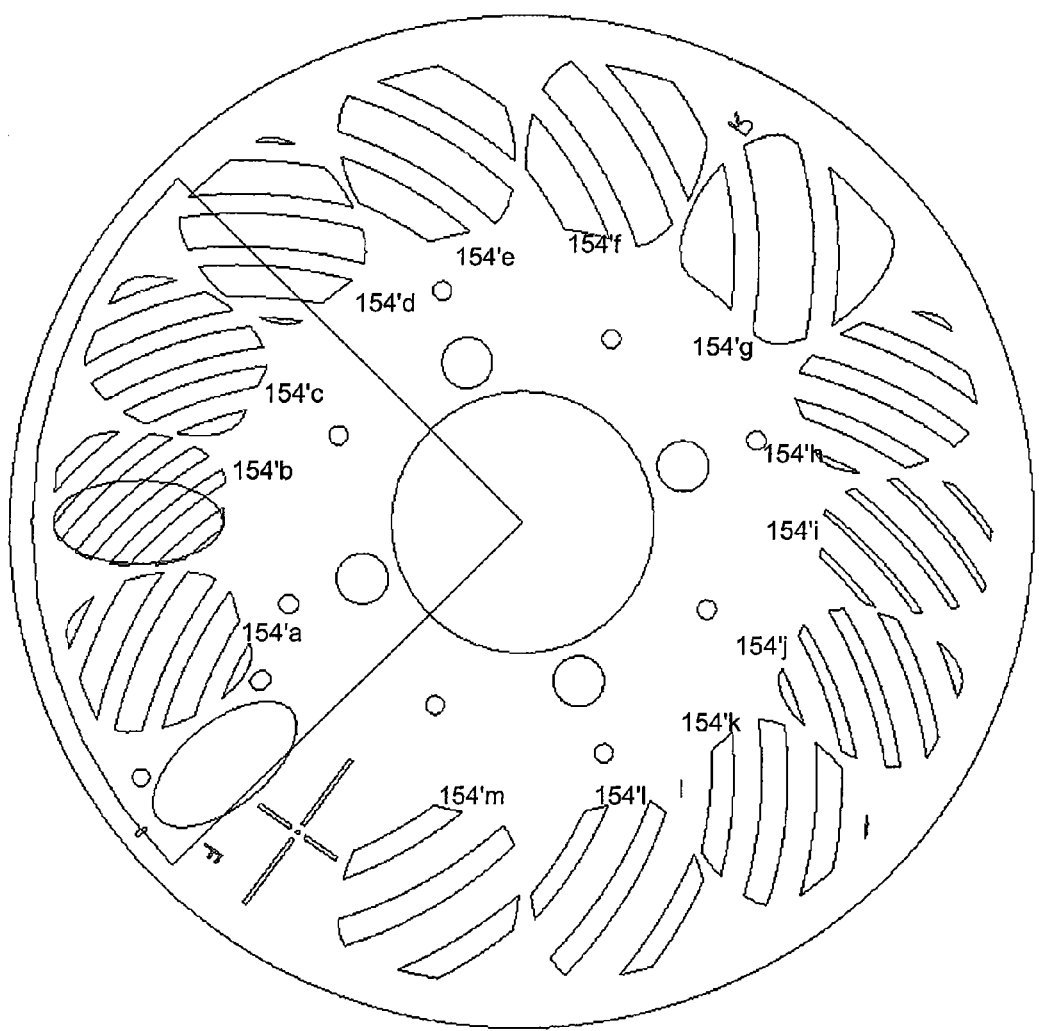
FIG. 6 illustrates a spatial filter, according to another embodiment of the invention.

FIG. 6 illustrates spatial filter 154', according to another embodiment of the invention.

Spatial filter 154' includes multiple opaque regions and multiple transparent regions.

Multiple groups of transparent regions (and accordingly opaque regions) such as groups 154'*a*-154'*m* are substantially shaped as portions of different spirals. The different spirals are characterized by different separation distances between successive spiral turnings. These opaque regions can be a linear approximation of these portions of the spirals. These spirals can be Archimedean spirals but this is not necessarily so.

Groups 154'*a*-154'*g* are approximations of portions of counterclockwise rotating spirals while groups 154'*h*-154'*m* are approximations of clockwise rotating spirals.

Conveniently, the axial distance between adjacent transparent regions within a first group of transparent region differs from an axial distance between adjacent transparent regions within a second group of transparent region. Referring to FIG. 6, the axial distance between opaque regions of group 154'*a* are smaller than the axial distance between opaque regions of group 154'*l*.

Figure 7:
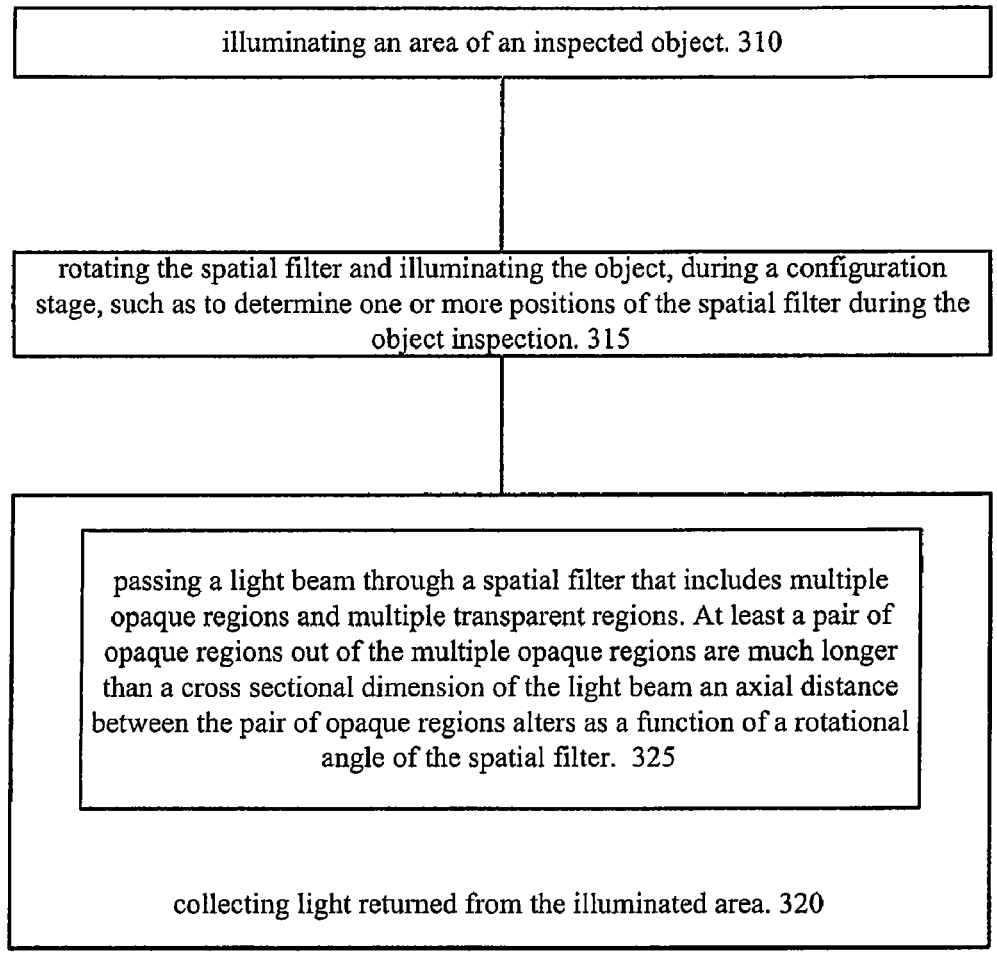
FIGS. 7 and 8 are flow charts illustrating methods for inspecting an object according to various embodiments of the present invention.

FIG. 7 is a flow chart illustrating method 300 for inspecting an object according to an embodiment of the present invention.

Method 300 starts by stage 310 of illuminating an area of an inspected object.

Stage 310 is followed by stage 320 of collecting light returned from the illuminated area.

According to an embodiment of the invention stage 320 includes stage 325 of passing a light beam through a spatial filter that includes multiple opaque regions and multiple transparent regions. At least a pair of opaque regions out of the multiple opaque regions are much longer than a cross sectional dimension of the light beam an axial distance between the pair of opaque regions alters as a function of a rotational angle of the spatial filter.

Stage 310 can be preceded by stage 315 of rotating the spatial filter, during a configuration stage, such as to determine one or more positions of the spatial filter during the object inspection. At multiple spatial filter positions the sample (or a test sample) is illuminated, and light signals are collected, detected and analyzed to determine the efficiency of the spatial filter. After multiple positions are evaluated one of these locations (usually the location that provides the best signal to noise ratio) is selected. It is noted that the positions can be selected in view of expected lobe patterns.

According to an embodiment of the invention stages 310 and 320 are repeated during an inspection of multiple areas of the inspected object. During these repetitions different patterns of the inspected object are illuminated and different positions of the spatial filter can be achieved by rotating the spatial filter.

Figure 8:
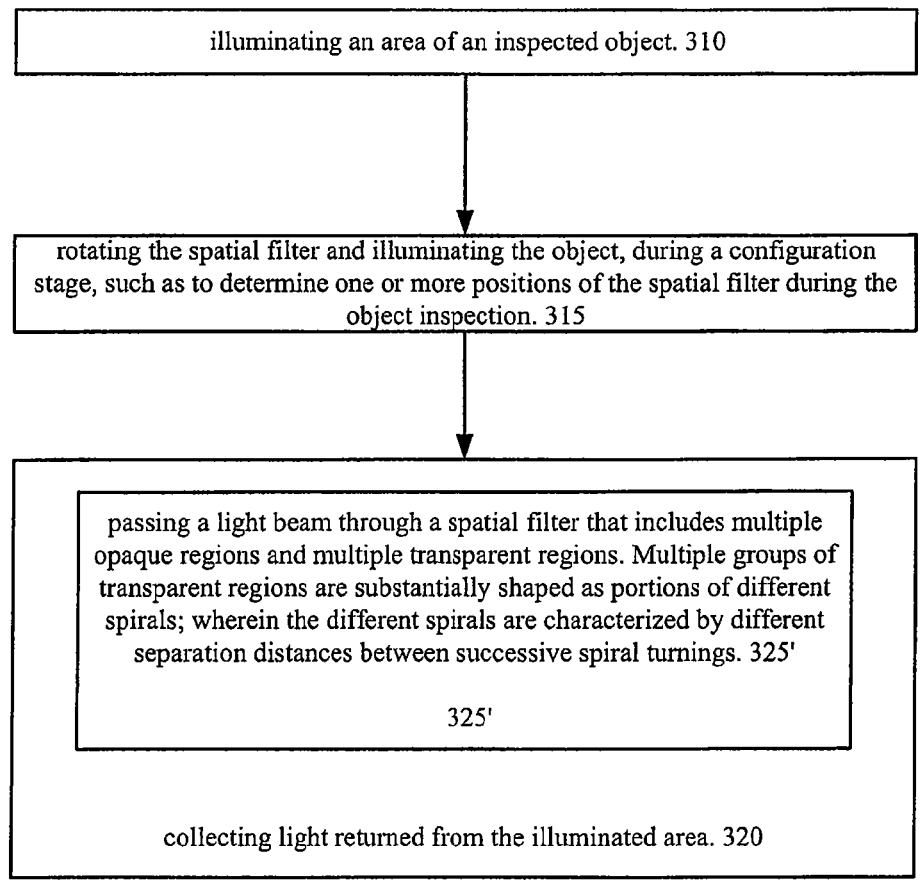

FIG. 8 is a flow chart illustrating method 301 for inspecting an object according to an embodiment of the present invention.

Method 301 differs from method 300 by including stage 325' instead of stage 325. Stage 325' includes passing a light beam through a spatial filter that includes multiple opaque regions and multiple transparent regions. Multiple groups of transparent regions are substantially shaped as portions of different spirals; wherein the different spirals are characterized by different separation distances between successive spiral turnings.

While the present invention has been described with respect to certain exemplary embodiments, it is not limited thereto, and the full scope of the present invention is defined in the appended claims, as interpreted in accordance with applicable law.

What is claimed is:

1. A spatial filter, comprising:
multiple opaque regions and multiple transparent regions, each transparent region defined by adjacent ones of the opaque regions and the opaque regions having different diverging or converging ratios so that the distance between pairs of opaque regions alters as a function of a rotational angle of the spatial filter, said rotational angle defined with respect to a radial line extending from a central axis of rotation of the spatial filter; wherein:
at least a first pair of opaque regions of the multiple opaque regions are much longer than a cross-sectional dimension of a light beam for impinging onto the spatial filter, an axial distance between the first pair of opaque regions constantly changes over an axial distance from the central axis of rotation of the spatial filter, a width of each opaque region of the first pair of opaque regions alters as a function of the rotational angle of the spatial filter, and the multiple opaque regions are shaped substantially as portions of different spirals, different ones of the spirals having different separation distances between successive spiral turnings.

2. The apparatus according to claim 1 wherein a radial distance between a pair of the multiple opaque regions constantly changes over an axial distance range.

3. The apparatus according to claim 1 wherein a width of each opaque region out of a second pair of the multiple opaque regions alters as a function of the rotational angle of the spatial filter.

4. The apparatus according to claim 1 wherein at least one of the multiple opaque regions is shaped as a linear approximation of a portion of a spiral.

5. The apparatus according to claim 1 wherein the multiple opaque regions and the transparent region are shaped according to expected lobe patterns.

* * * * *